Oct. 9, 1928.
F. L. LANE
1,686,915
WOODWORKING MACHINE
Filed Jan. 12, 1925
17 Sheets-Sheet 1
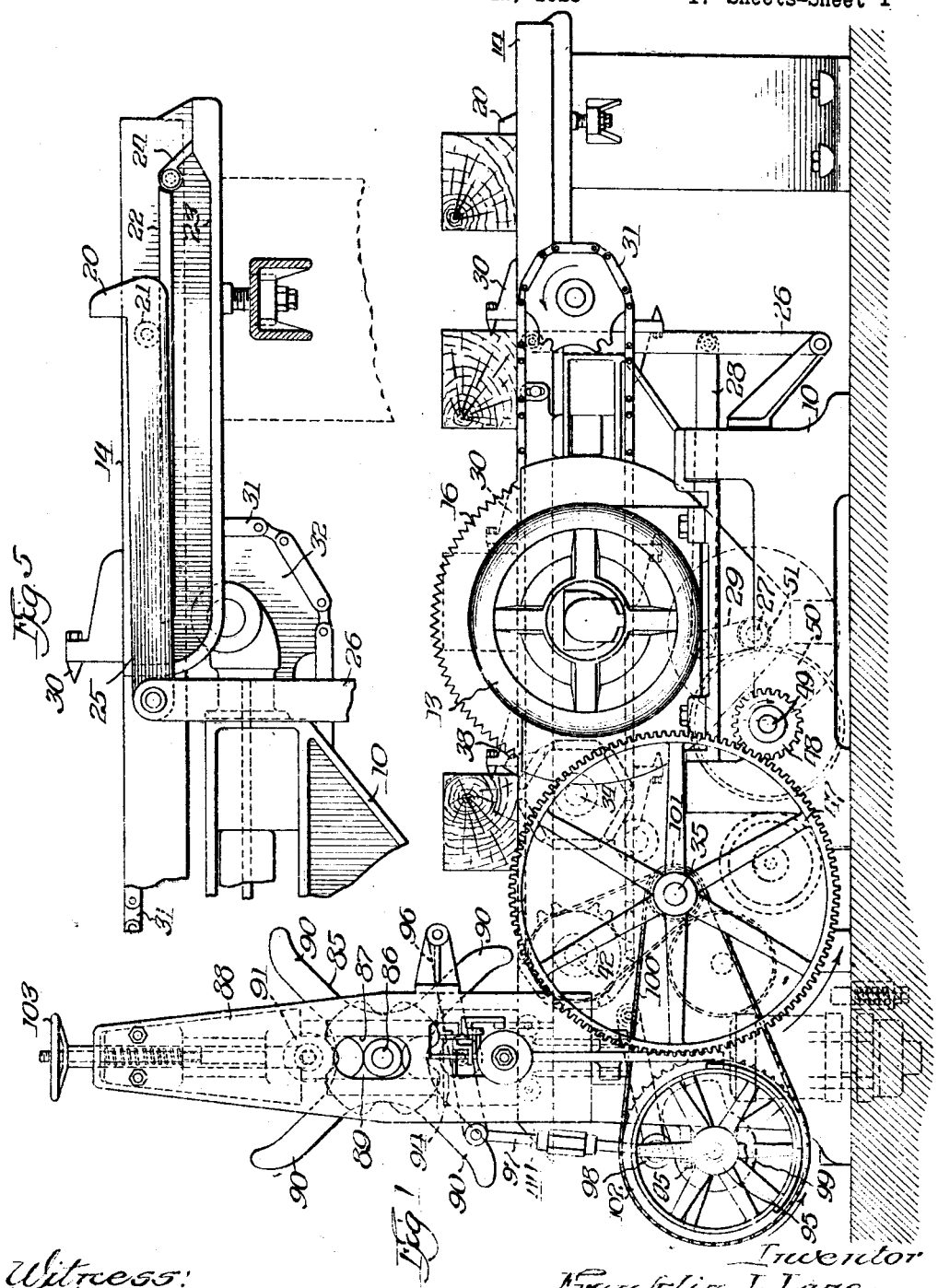

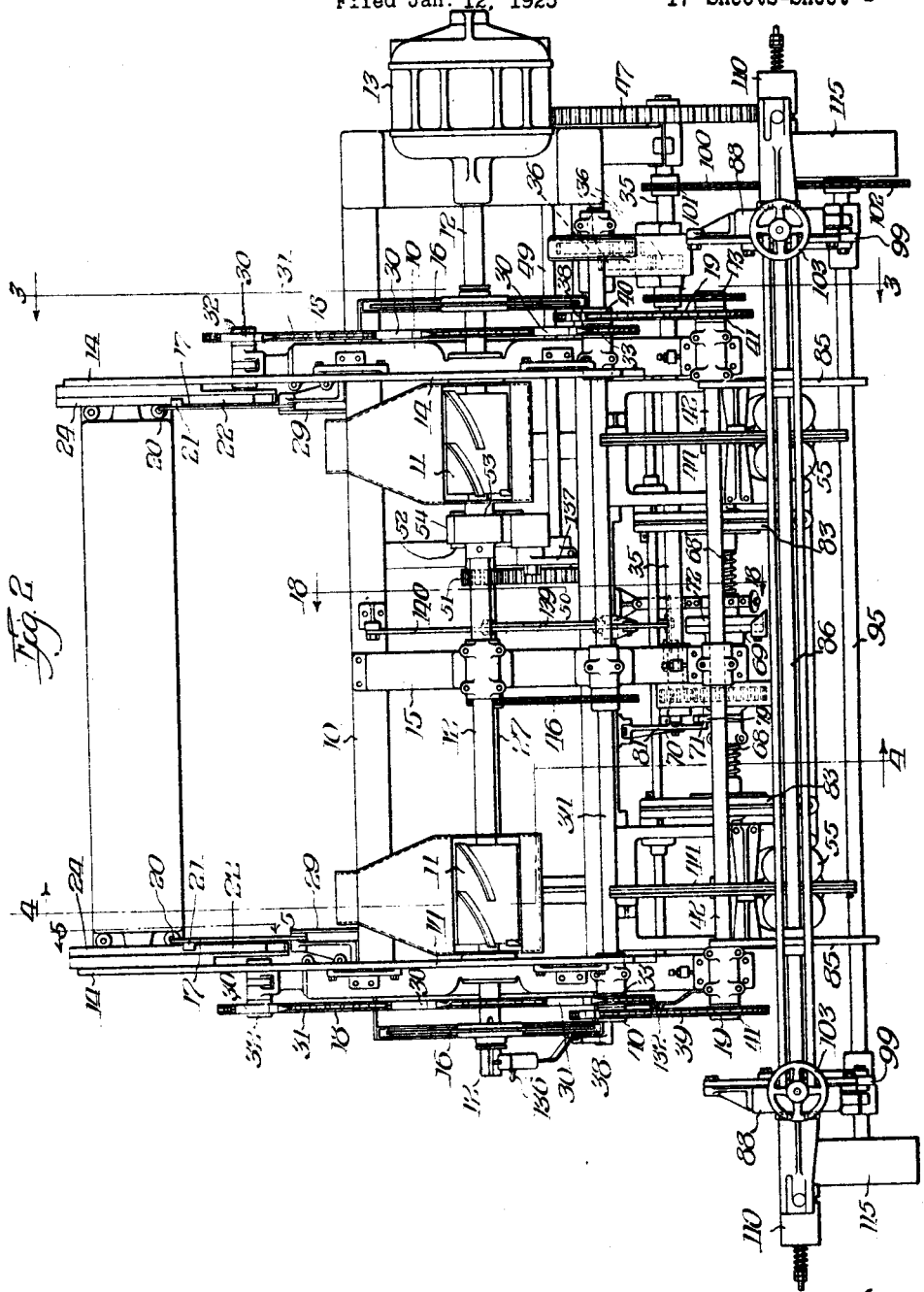

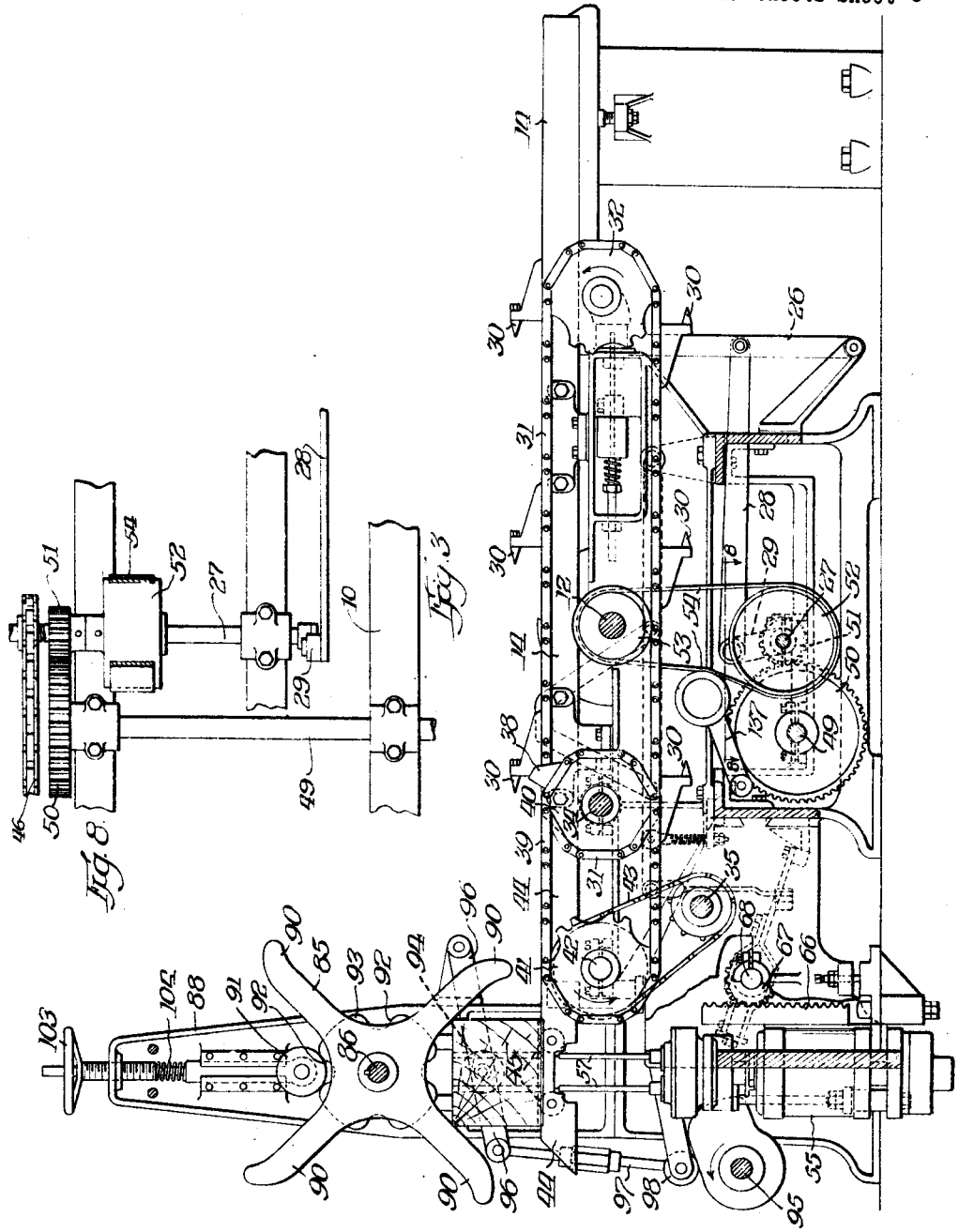

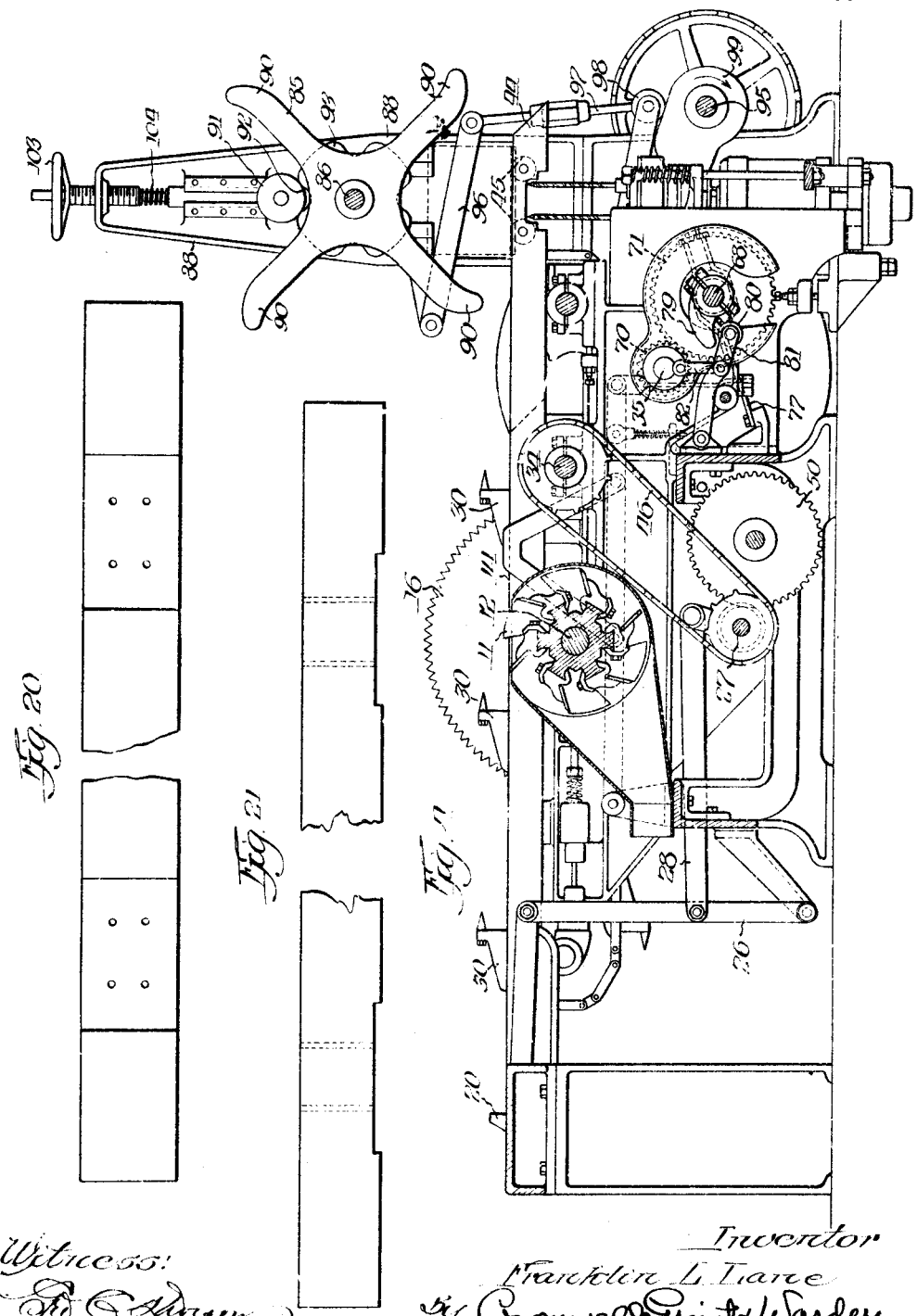

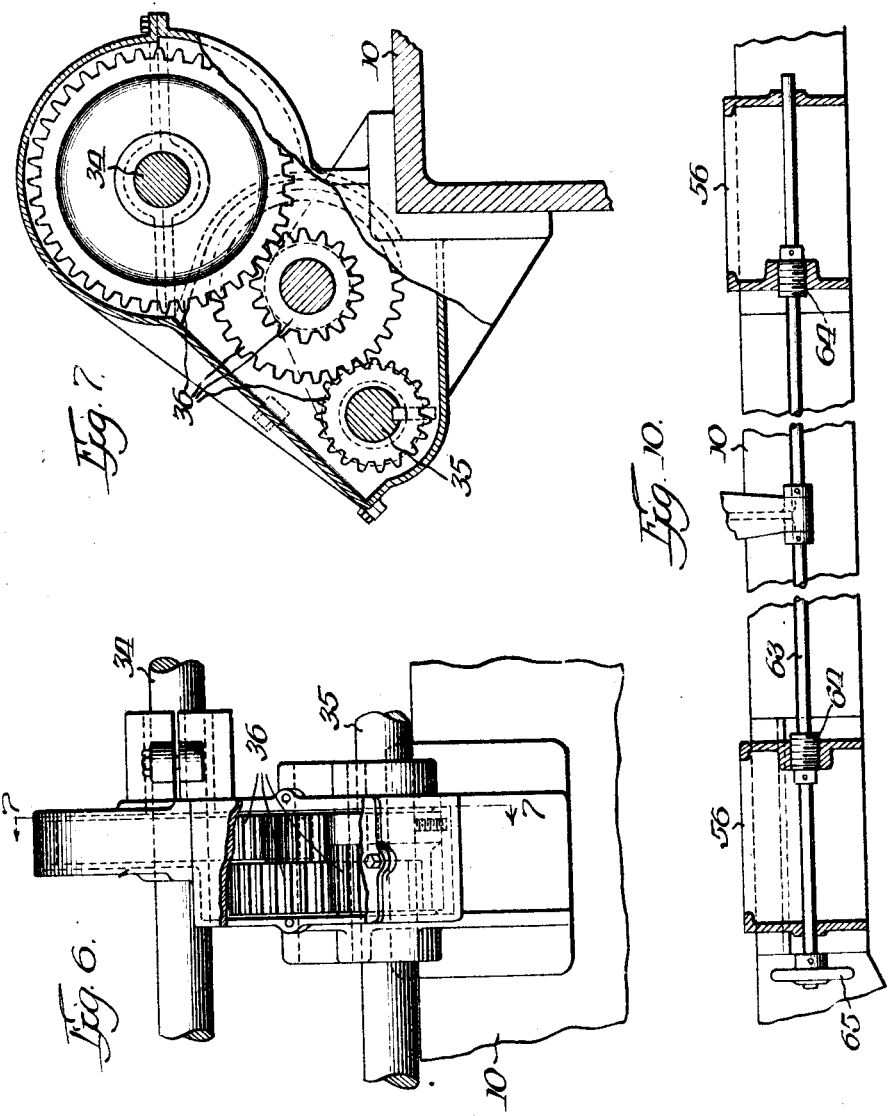

Oct. 9, 1928.
F. L. LANE
1,686,915
WOODWORKING MACHINE
Filed Jan. 12, 1925
17 Sheets-Sheet 6
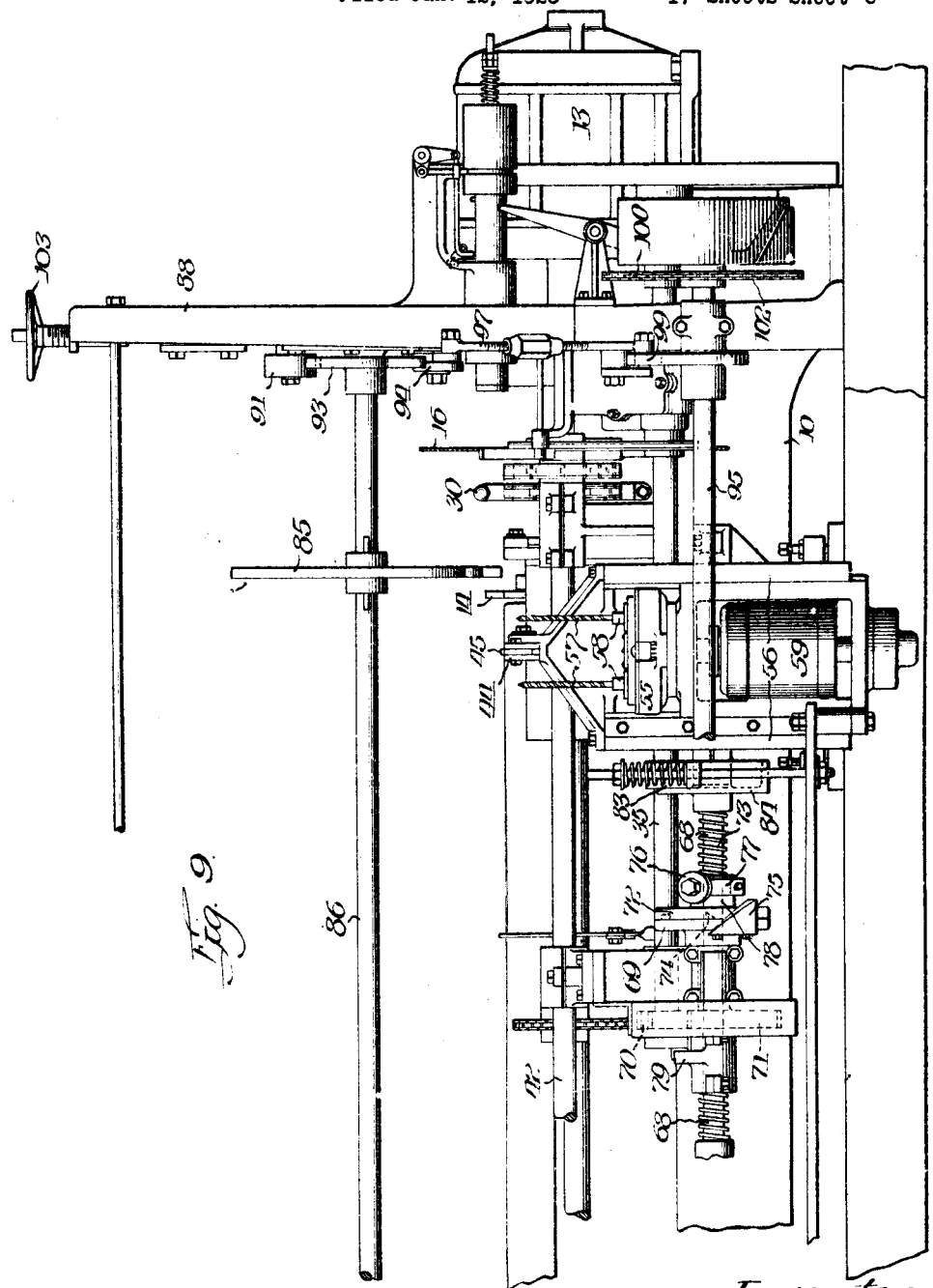

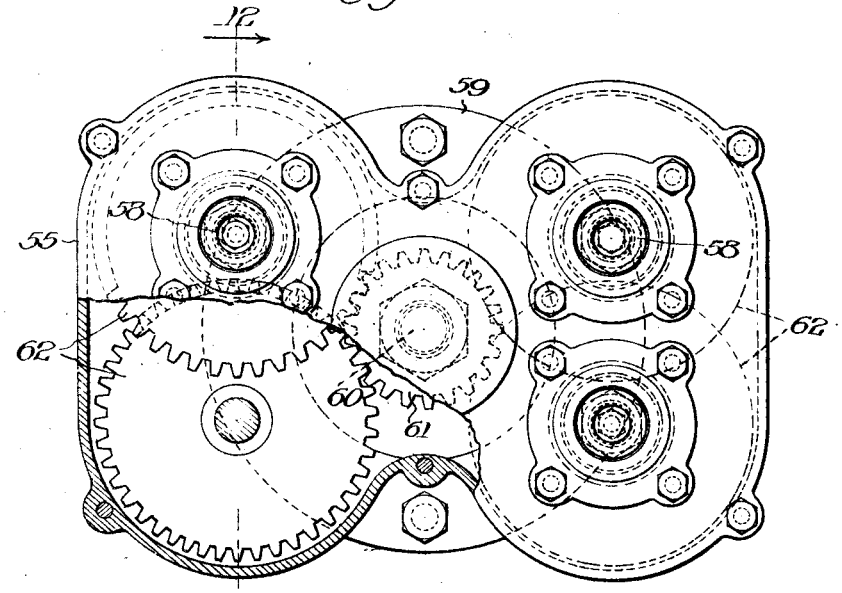
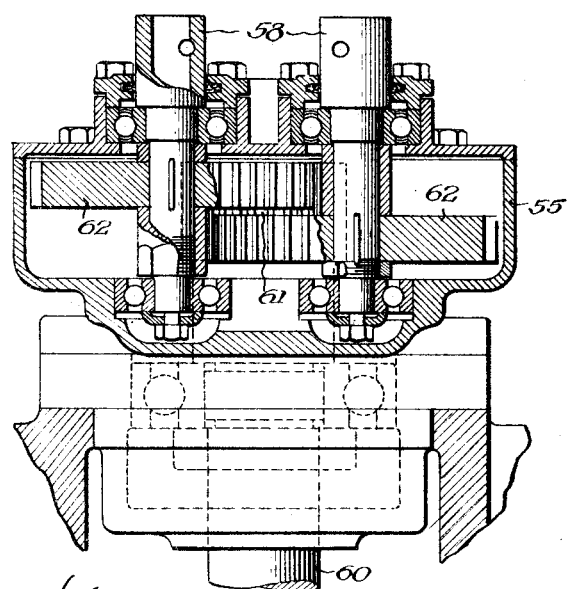

Oct. 9, 1928.  1,686,915
F. L. LANE
WOODWORKING MACHINE
Filed Jan. 12, 1925  17 Sheets-Sheet 8
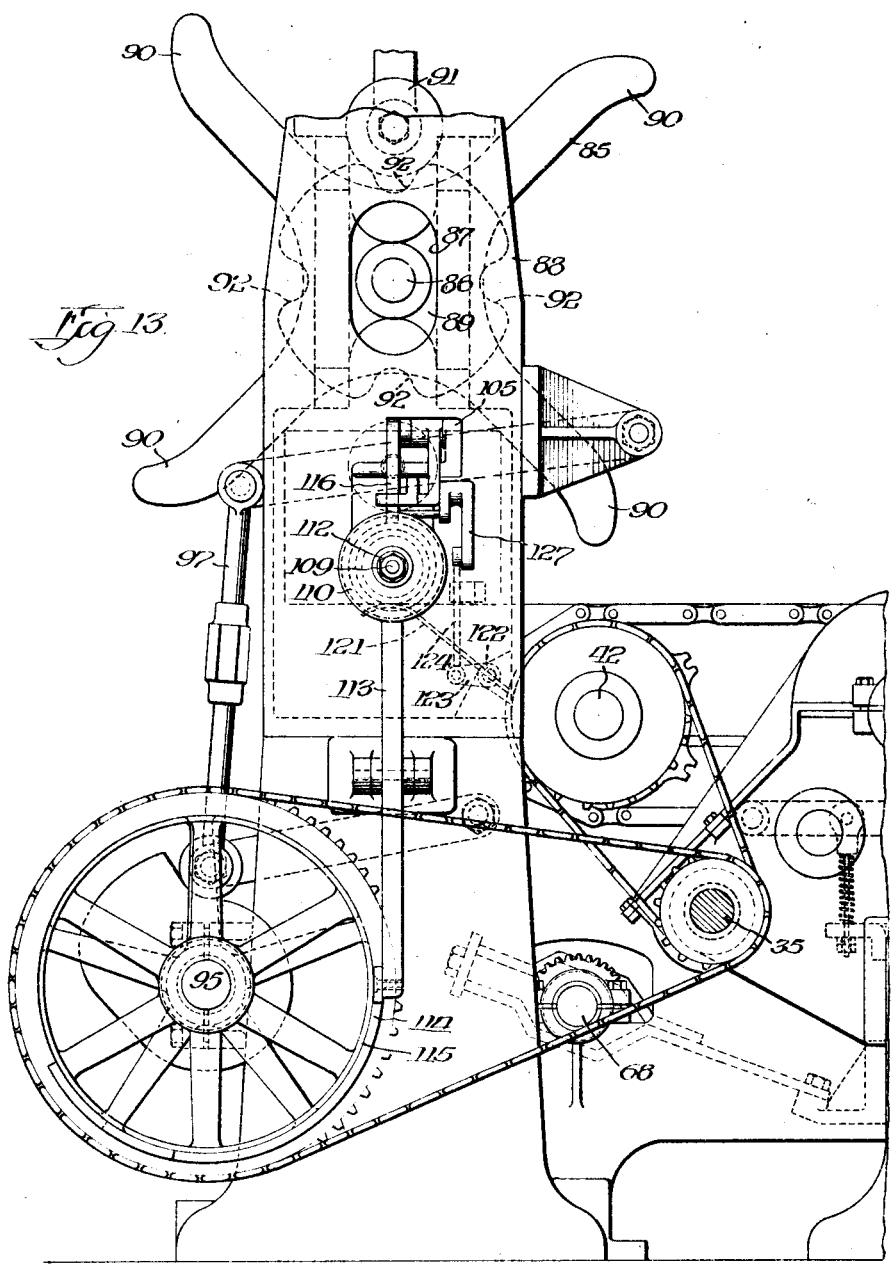

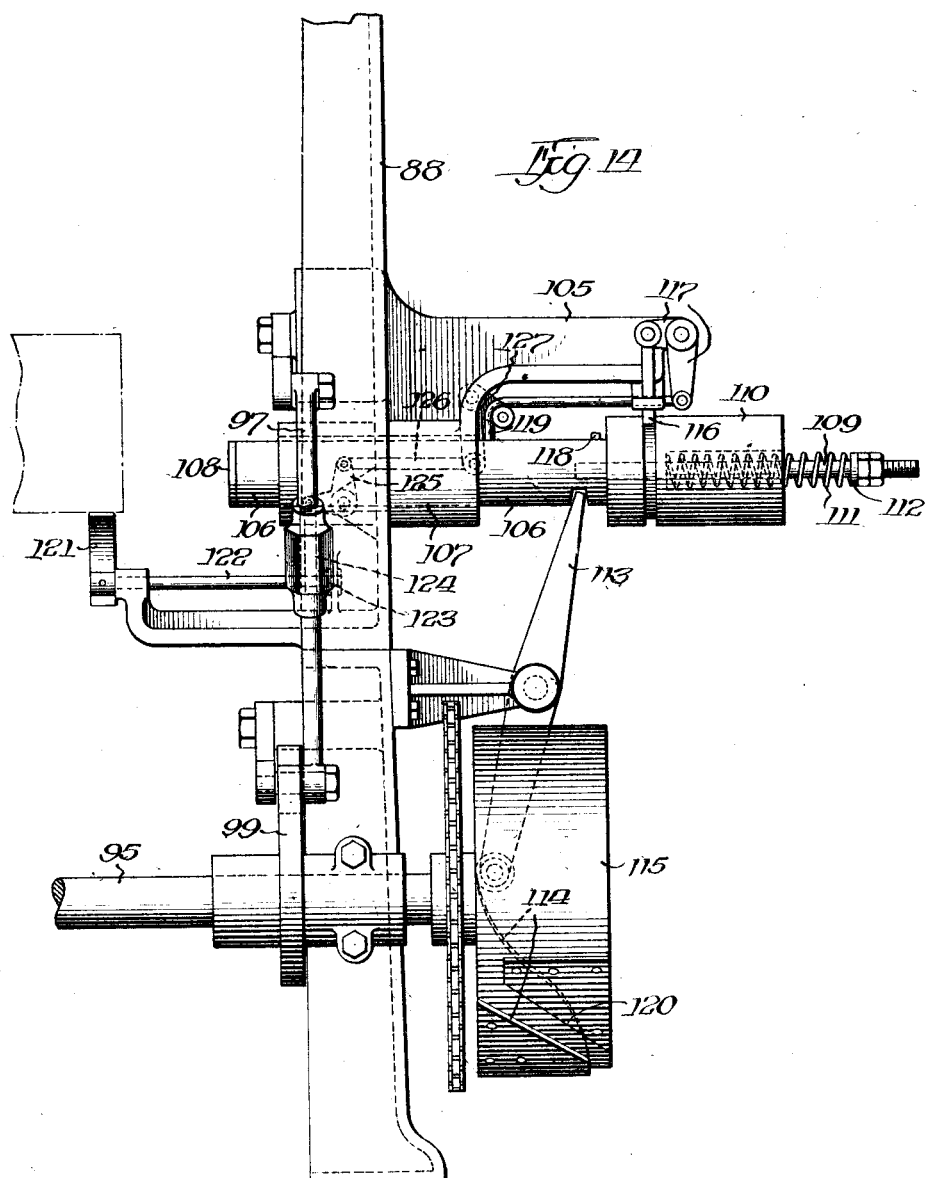

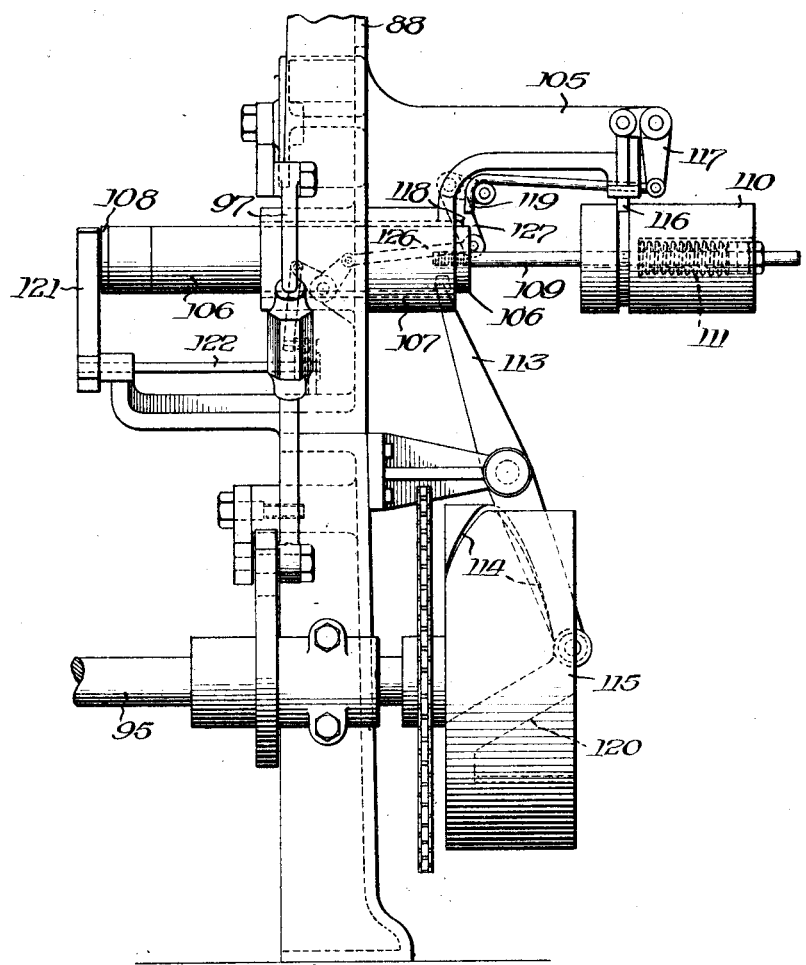

Oct. 9, 1928.  
F. L. LANE  
1,686,915  
WOODWORKING MACHINE  
Filed Jan. 12, 1925 17 Sheets-Sheet 11
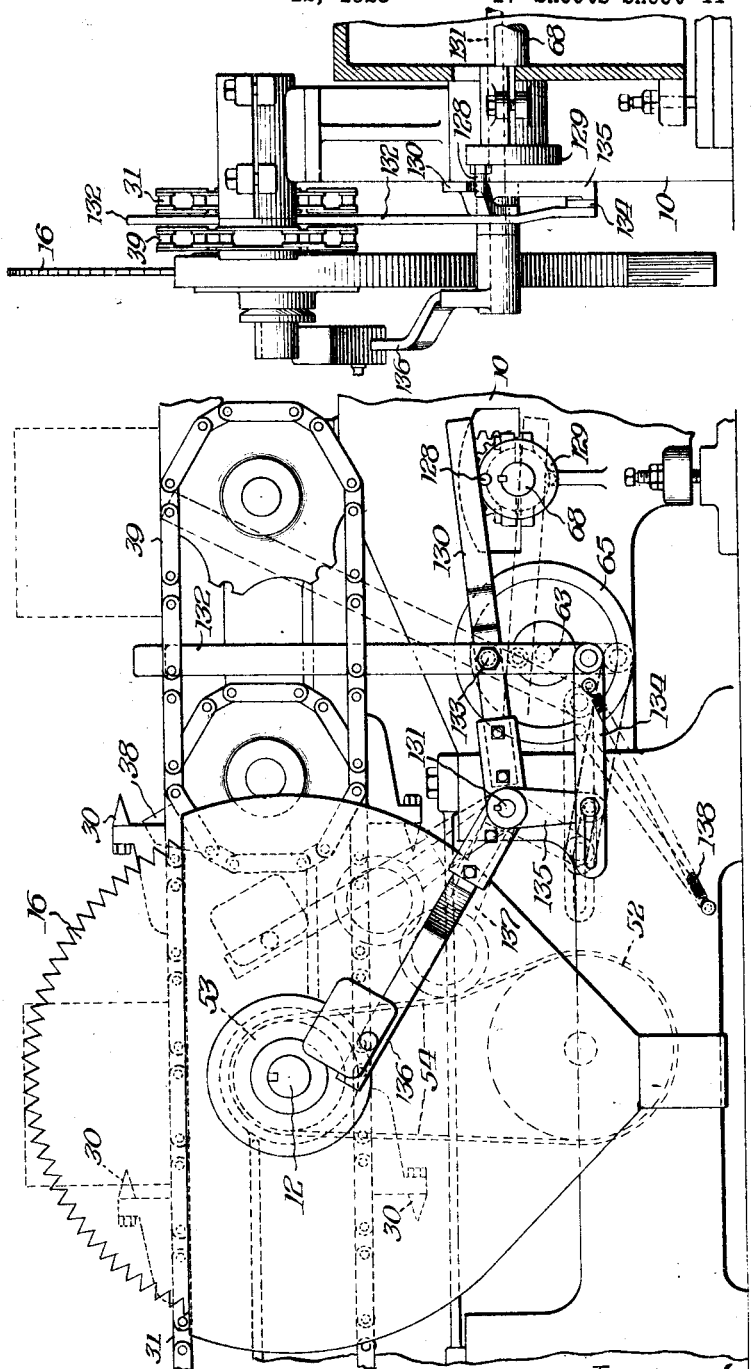

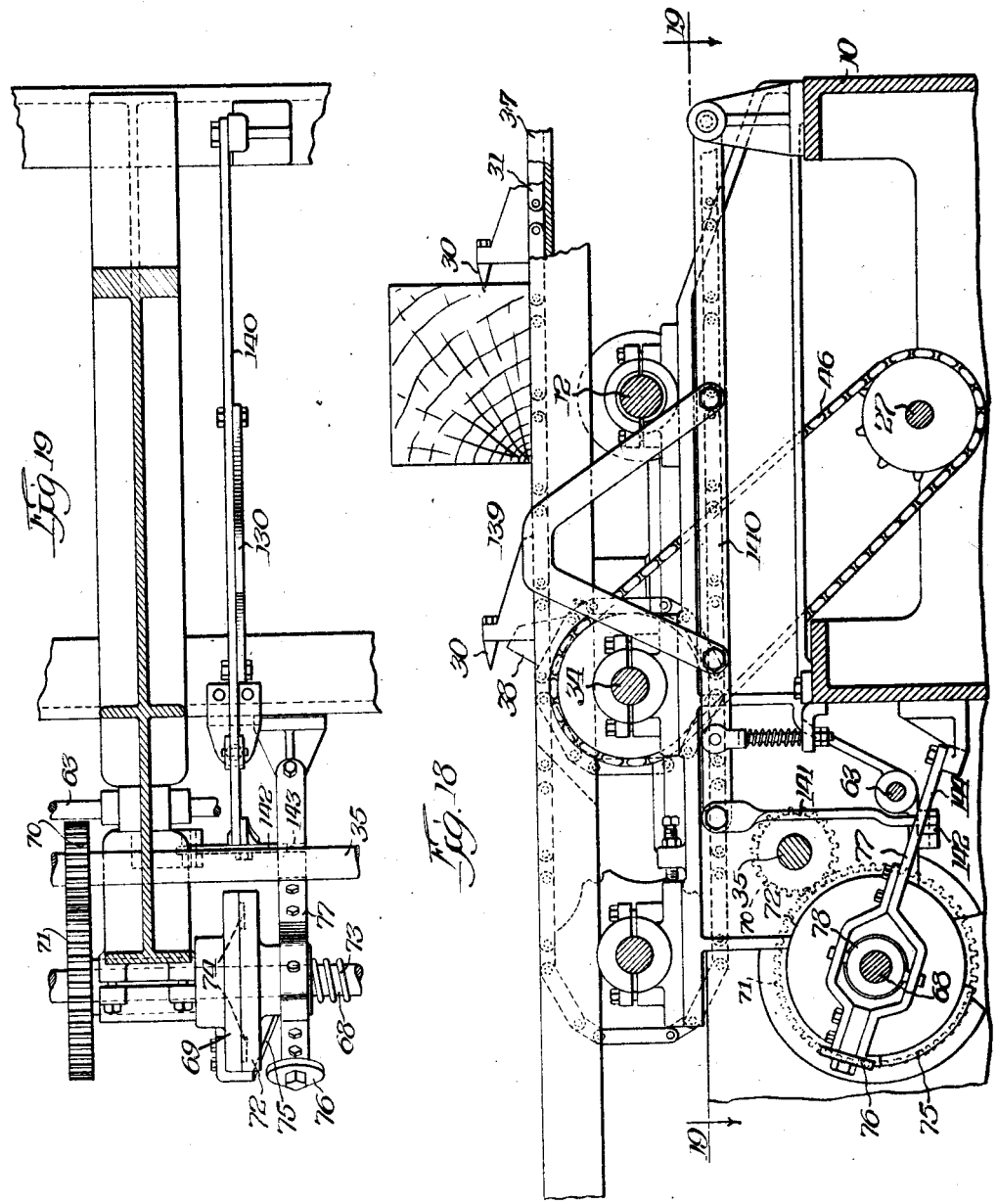

Oct. 9, 1928.
F. L. LANE
1,686,915
WOODWORKING MACHINE
Filed Jan. 12, 1925     17 Sheets-Sheet 13
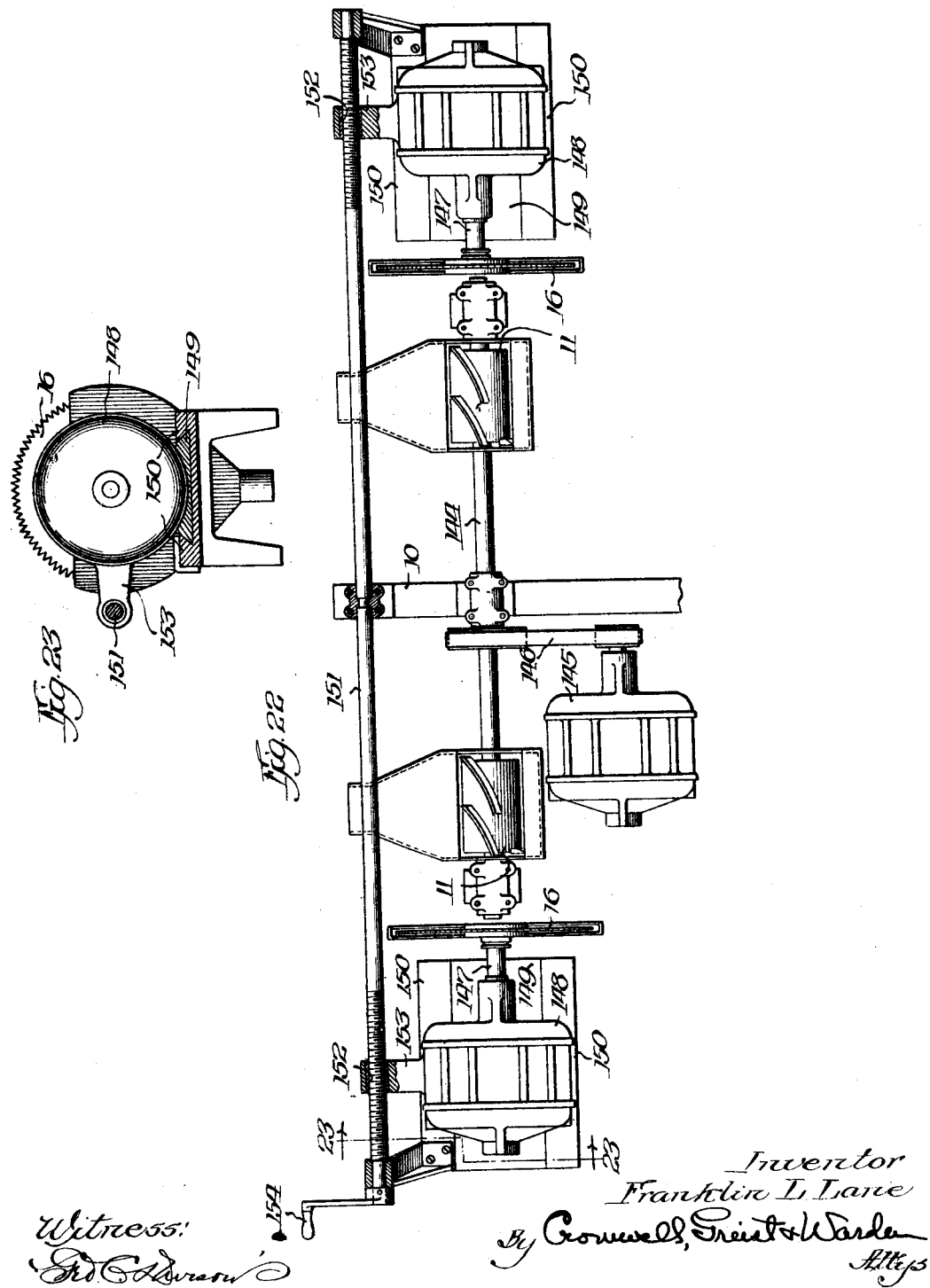

Oct. 9, 1928.  1,686,915
F. L. LANE
WOODWORKING MACHINE
Filed Jan. 12, 1925      17 Sheets-Sheet 14
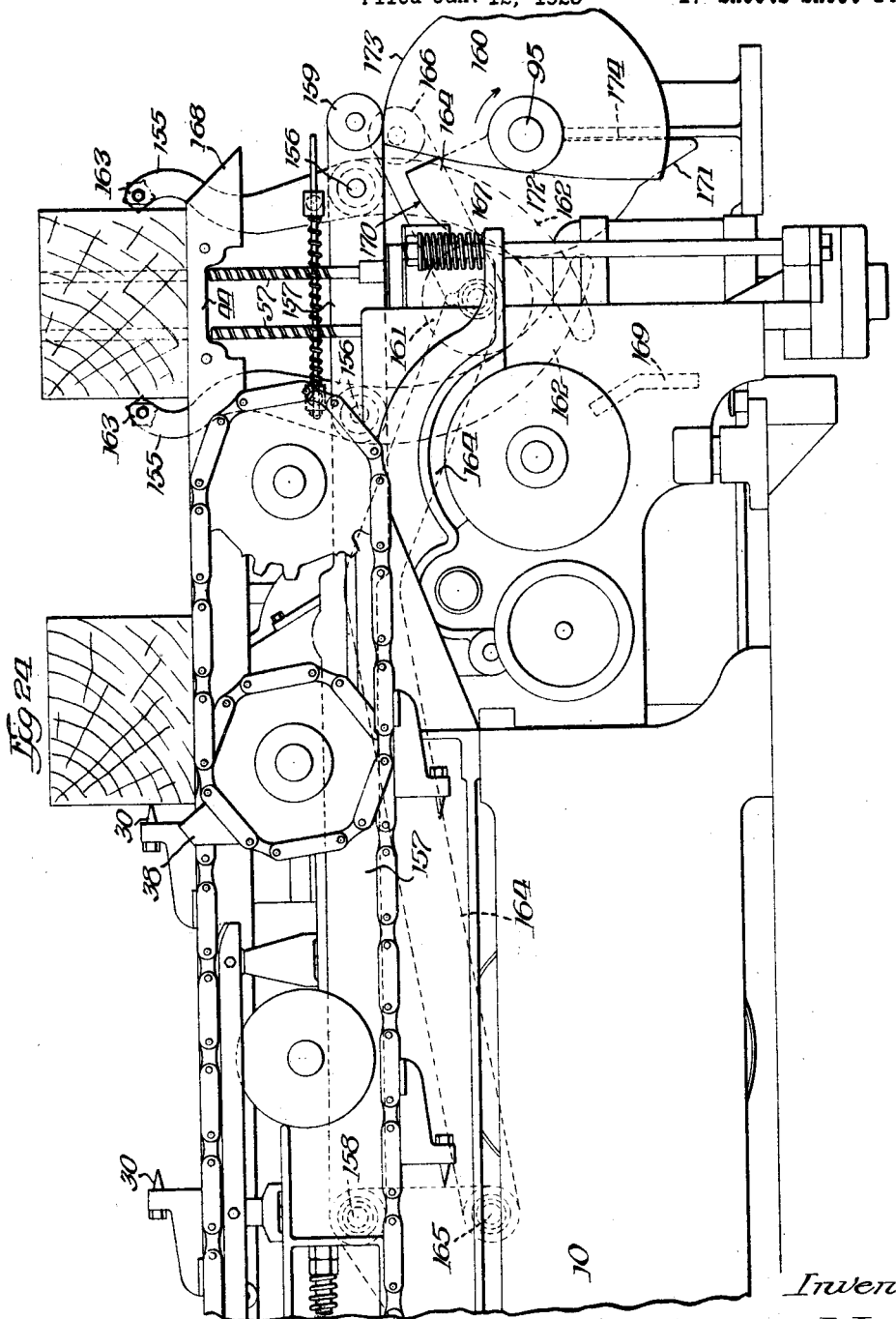

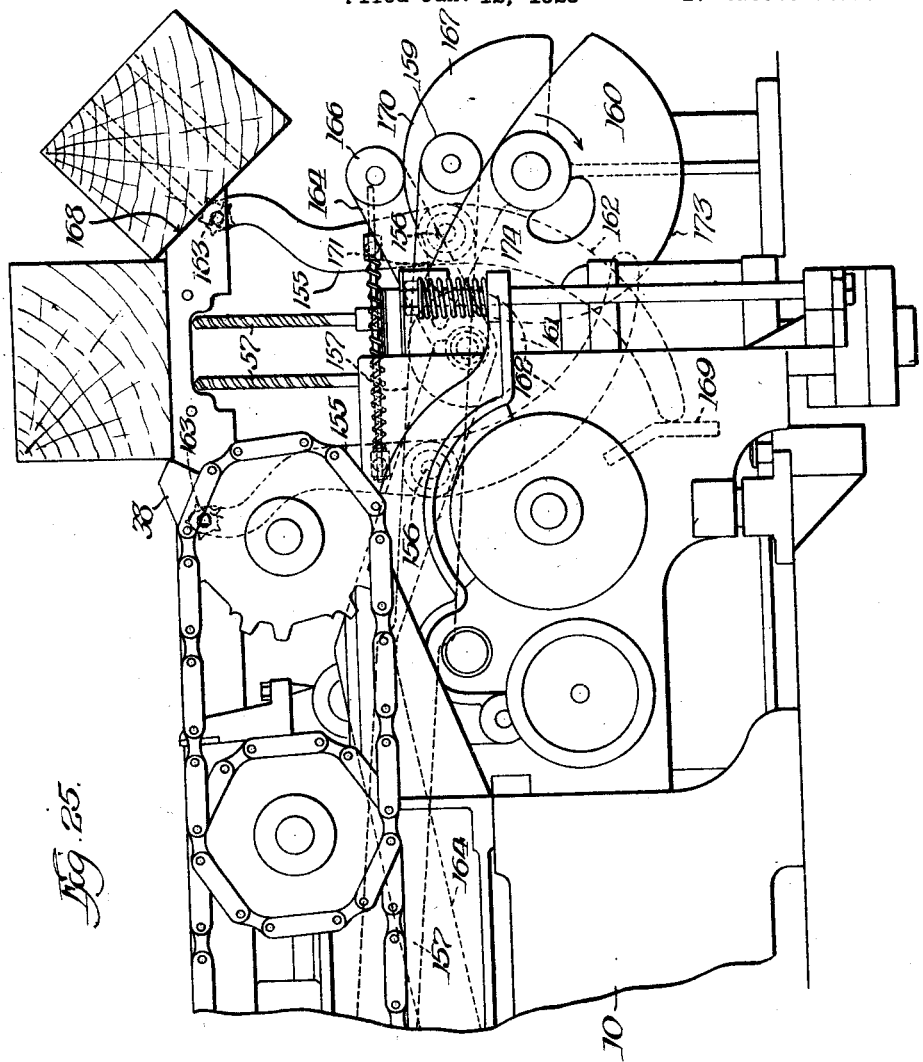

Oct. 9, 1928.  
F. L. LANE  
1,686,915  
WOODWORKING MACHINE  
Filed Jan. 12, 1925  
17 Sheets-Sheet 16
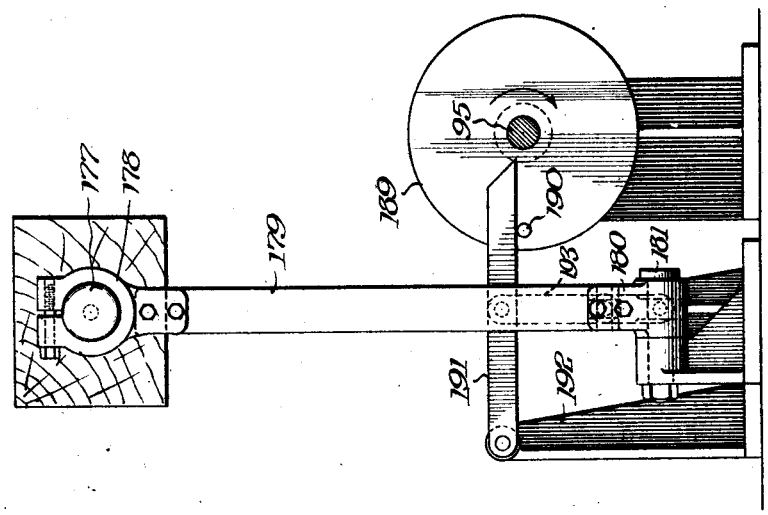
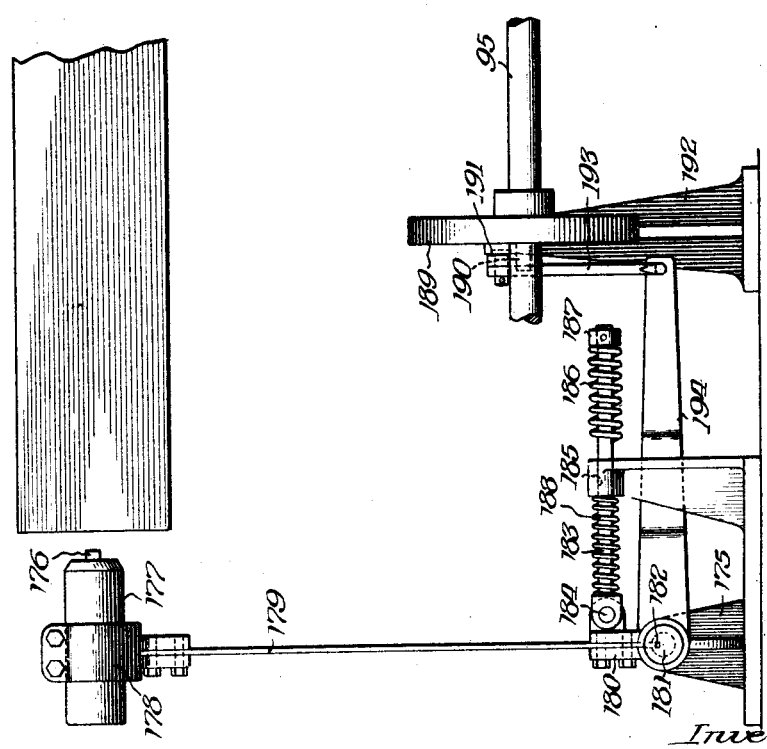

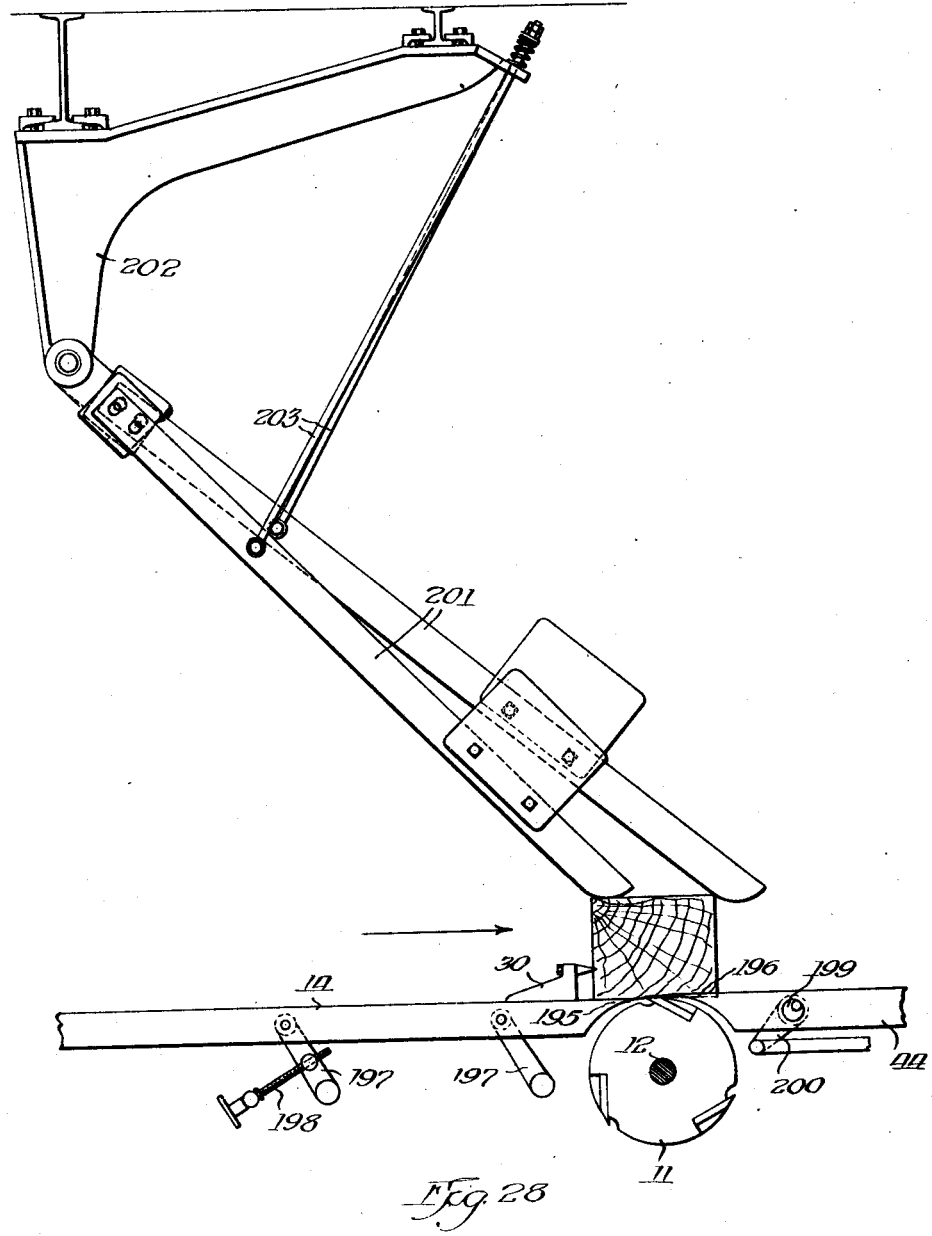

Patented Oct. 9, 1928.

1,686,915

UNITED STATES PATENT OFFICE.

FRANKLIN L. LANE, OF BELOIT, WISCONSIN, ASSIGNOR TO P. B. YATES MACHINE COMPANY, OF BELOIT, WISCONSIN, A CORPORATION OF WISCONSIN.

WOODWORKING MACHINE.

Application filed January 12, 1925. Serial No. 1,742.

The present invention relates to woodworking machines, and is particularly concerned with a machine for finishing railway ties. The invention, however, is susceptible of incorporation in machines for performing generally analogous operations upon work other than railway ties.

The principal object of the invention is to provide an automatic machine of the character described which is adapted to receive railway ties in a rough-cut state and deliver the same in a finished condition ready for the reception and attachment of the rails.

The machine hereinafter disclosed as illustrative of the invention will cut seats in the ties for the rail plates or the rails, will bore holes in the ties at the seats for the spikes, will cut the ties to length with their ends equally spaced from the seats, and will mark the ends of the ties with any desired data. The machine will automatically perform all of such operations in proper synchronism, and will furthermore automatically discontinue certain of such operations under those conditions of operation in which a temporary interruption becomes necessary.

While the foregoing statements are indicative of the nature of the invention, many other objects and advantages will be evident to those skilled in the production of railway ties upon an understanding of the construction, arrangement and operation of the machine which is disclosed in the accompanying drawings and in the following detailed description. The machine selected to exemplify the invention is susceptible of being modified in numerous respects without departing from the spirit of the invention as defined by the comprehensive scope of the appended claims, and a few of such modifications are disclosed in the drawings and description as illustrative of this statement.

In the drawings:

Fig. 1 is a side view of the machine;
Fig. 2 is a top view of the machine;
Fig. 3 is a section taken on the line 3—3 of Fig. 2;
Fig. 4 is a section taken on the line 4—4 of Fig. 2;
Fig. 5 is a section taken on the line 5—5 of Fig. 2;
Fig. 6 is a detailed view of the gear train which drives the conveying mechanism;
Fig. 7 is a section taken on the line 7—7 of Fig. 6;

Fig. 8 is a section taken on the line 8—8 of Fig. 3;
Fig. 9 is a fragmentary end view of the machine;
Fig. 10 is a fragmentary view, showing the device for adjusting the boring mechanism;
Fig. 11 is a plan view of one of the boring heads;
Fig. 12 is a section taken on the line 12—12 of Fig. 11;
Fig. 13 is an enlarged side view of the outfeeding end of the machine, showing the marking mechanism;
Fig. 14 is an enlarged end view of one side of the machine, showing the marking mechanism in its normal position;
Fig. 15 is a similar view, showing the marking mechanism in its striking position.
Fig. 16 is a fragmentary side view of the machine, showing the device for stopping the machine in the event that the boring heads fail to drop from the bored tie;
Fig. 17 is an end view of the stop device;
Fig. 18 is a section taken on the line 18—18 of Fig. 2, showing the device for preventing the boring mechanism from functioning in the event that no tie is delivered into operative relation thereto;
Fig. 19 is a section taken on the line 19—19 of Fig. 18;
Fig. 20 is a top view of a tie finished by the machine;
Fig. 21 is a side view of the tie.
Fig. 22 is a plan view of a modified form of the adzing and sawing mechanisms;
Fig. 23 is a section taken on the line 23—23 of Fig. 22;
Fig. 24 is a side view of a modified form of the mechanism for positioning the ties with respect to the boring mechanism;
Fig. 25 is a similar view of the positioning mechanism at another stage in its operation;
Fig. 26 is an end view of a modified form of the marking mechanism;
Fig. 27 is a side view af the marking mechanism, and
Fig. 28 is a side view of a modified arrangement of the two sets of rails which support the tie during its passage through the machine.

Reference will first be made to that form of the invention illustrated in Figs. 1 to 19 inclusive of the drawings.

The several hereinafter described mechanisms of the machine which embody the salient features of the invention are mounted upon a generally rectangular frame 10. In the operation of the machine, the ties to be finished are moved sidewise in single order from the in-feeding end of the frame 10 to the out-feeding end of the same, and are acted upon by the mechanisms in the course of such movement.

The adzing mechanism (see Fig. 2)— which operates to cut two spaced seats in a common plane in the tie for the reception of the usual rail plates—includes two adjustably spaced cutter heads 11 which are secured to a horizontal transverse shaft 12. The shaft 12 is journaled in the sides of the frame 10, and is rotated rapidly by an electric motor 13, at one end of the same. The heads 11 cut the seats in the under side of the tie while the tie is being moved thereabove along two supporting rails 14 which are positioned along the sides of the frame 10 in vertical planes closely adjacent the sides of the heads and at such elevation with respect to the heads as to cut the seats to the desired depth. The heads 11 are suitably encased at all points below the top level of the rails 14, and the shaft 12 is additionally supported intermediate the sides of the frame 10 in a journal on a longitudinal frame member 15.

The sawing mechanism (see Fig. 2)— which operates to cut the ends of the tie at points equidistant from the seats cut by the adzing mechanism—includes two spaced disc saws 16 which are secured to the shaft 12 exteriorly of the heads 11 and the rails 14. The saws 16 project segmentally above the rails 14 a distance well in excess of the thickness of the tie, and cut the ends of the tie squarely while the heads 11 are cutting the seats.

The conveying mechanism (see Fig. 2)— which operates in three stages to move the ties sidewise in single order through the machine—consists of an intermittently operating device 17 at the in-feeding end of the frame 10, a continuously operating device 18 to which the ties are transferred from the device 17, and another intermittently operating device 19 to which the ties are transferred from the device 18.

The feeding device 17 of the conveying mechanism (see Figs. 1 and 5)—includes two reciprocating hooks 20 which are positioned in transverse alignment alongside the rails 14 at the in-feeding end of the machine. The hooks 20 move away from the in-feeding end in raised positions above the top level of the rails 14, and return toward the in-feeding end in lowered positions, whereby to draw a tie placed upon the rails 14 into the machine along the rails and then return and repeat the operation on the next tie. The alternately raised and lowered positions of the hooks 20 is effected by supporting the hooks on rollers 21, which rollers travel, in their advance movement, on raised tracks 22 until at the end of such movement they reach the ends of the tracks and drop down, and in their return movement, on lowered tracks 23 until at the end of such movement they pass through inclined one-way doors 24 into position to ride up the doors onto the raised tracks 22 upon their next advance movement. The reciprocating movement of the hooks 20 is effected by coupling the advance ends 25 of the hooks to the upper ends of levers 26 which are oscillated from a shaft 27 through connecting rods 28 and crank arms 29. The shaft 27 of course, makes one revolution to each feeding movement of the hooks 20.

The feeding device 18 of the conveying mechanism (see Figs. 2 and 3) consists of a number of sharply pointed dogs 30 which are carried in transversely aligned pairs by two endless chains 31. The chains 31 are trained at one end of their travel over idler sprockets 32 and at the other end of their travel over drive sprockets 33. The drive sprockets 33 are secured to a shaft 34 which is rotated from a shaft 35 through a number of intermeshed reduction gears 36 (see Figs. 6 and 7). The upper stretches of the chains 31 may be supported in channel members 37 to prevent the dogs 30 from tilting back out of their normal positions under the resistance offered by the ties when being advanced by the dogs. The dogs 30 move up behind a tie which has been left by the hooks 20 in position for the dogs, bite into the rear side of the tie, and advance the tie slowly along the rails 14 through the zone of action of the adzing and sawing mechanisms.

The feeding device 19 of the conveying mechanism (see Figs. 2 and 3) consists of two lugs 38 which are carried in transverse alignment by two endless chains 39. The chains 39 are trained over idler sprockets 40 at one end of their travel and over drive sprockets 41 at the other end of their travel. The idler sprockets 40 are journaled freely on the shaft 34 at the sides of the sprockets 33, and the drive sprockets 41 are secured to a shaft 42 which is rotated from the shaft 35 by a chain and sprocket connection 43. The lugs 38 move up behind a tie which has been left by the dogs 30 in position for the lugs, and advance the tie along two supporting rails 44 onto rollers 45 carried by the rails 44 beyond the device 19 and directly over the boring mechanism hereinafter described. The rails 44, which serve as continuations of the rails 14, are positioned in longitudinal alignment with the centers of the cutter heads 11, and the seats cut in the ties by the heads accordingly bear upon the rails 44 and support the ties with the seats thereof in a true horizontal plane for accurate work by the boring mechanism.

The movement of each tie by the device 17 of the conveying mechanism is relatively rapid, in order that the operators may have ample time between the advancing operations of the device 17 in which to place a tie upon the in-feeding ends of the rails 14; the succeeding movement of the tie by the device 18 is relatively slow but continuous, as the device 18 moves only the distance between two successive pairs of dogs 30 during each cycle of operation of the device 17; and the succeeding movement of the tie by the device 19 is relatively rapid and corresponds to that of the device 17, as the device 19 must effect a cycle of operation while the device 18 is moving only the distance between two successive pairs of dogs 30. The means for rotating the shaft 27 of the device 17 consists of a chain and sprocket connection 46 between the shaft 27 and the shaft 34 of the device 18; and the means for rotating the shaft 35, which in turn rotates the shafts 34 and 42 of the devices 18 and 19, consist of a large gear 47 secured to the shaft 35, a relatively small pinion 48 secured to a shaft 49 and meshed with the gear 47, a large gear 50 secured to the shaft 49, a relatively small pinion 51 journaled freely on the shaft 27 as a bearing and meshed with the gear 50, a pulley 52 also journaled freely on the shaft 27 and secured at one side to the pinion 51 for rotation with the same, another pulley 53 secured to the main drive shaft 12, and a belt 54 trained over the pulleys 52 and 53, all as shown in Figs. 1, 3 and 8.

The boring mechanism (see Figs. 9, 10, 11 and 12)—which operates to drill a number of holes through the tie within the areas of the seats for the reception of the spikes—includes two drill units 55 which are mounted for vertical movement in two guiding frames 56 positioned below the ends of the rails 44. Each of the drill units 55 consists of four drills 57 removably mounted in rotatable holders 58, an electric motor 59 having an armature shaft 60, and an enlarged pinion 61 on the armature shaft meshing with gears 62 on the holders 58. The guiding frames 56 are adjustably spaced from each other at points equidistant from the center line of the machine by means of an axially non-movable rod 63 having oppositely directed screw-thread connections 64 with the frames 56 and an adjusting hand wheel 65 at one extremity. When it is desired to change the distance between the drill units 55 to correspond to any change made in the distance between the cutter heads 11, the hand wheel 65 is turned and the guiding frames 56 containing the drill units 55 are as a consequence shifted.

The drill units 55 move upwardly when a tie is placed thereabove by the lugs 38 of the feeding device 19, and the rotating drills 57 bore the holes in the tie during such upward movement. The means for moving the drill units 55 upwardly consists of two vertical racks 66 secured to the units, two pinions 67 secured to a shaft 68 and meshed with the racks 66, a clutch element 69 journaled freely on the shaft 68 and rotated continuously from the shaft 35 by intermeshed gears 70 and 71 secured respectively to the shaft 35 and to the clutch element 69, and another clutch element 72 splined to the shaft 68 and shifted axially thereof under action of a compressed spring 73 into engagement with the clutch element 69. The coacting faces of the clutch elements may be provided with interfitting lugs and sockets 74 for effecting the desired driving connection between the elements. When the driving connection is effected, the shaft 68 will be rotated from the shaft 35 and will cause the drill units 55 to move upwardly. When the units reach their uppermost positions and have accordingly completed their boring operation, a deflector plate 75 on the periphery of the continuously rotating clutch element 69 revolves into camming engagement with a roller 76 on a pivoted lever 77 which is journaled intermediate its ends on a collar 78 of the clutch element 72, and forces the clutch element 72 axially away from the clutch element 69 to release the driving engagement therebetween. The disengagement of the clutch element 72 from the shaft 68 permits the drill units 55 to drop to their lowermost position in readiness for the next drilling operation. In order to insure that the drills will not catch accidentally in the ties and thereby prevent the drill units from dropping, an arm 79 is secured on the shaft 68 in such position relative thereto that, when the drill units are ready to drop, the arm will assume the horizontal position shown in Fig. 4 in the path of a vertically movable roller 80. The roller 80 is mounted on the free end of a pivoted lever 81 which is oscillated in a vertical plane by means of a link 82 which is pivoted eccentrically to the collar on the end of the shaft 35. If the drill units should not drop immediately upon the completion of the boring operation, the roller 80 will push the arm 79 upwardly and start the reverse rotation of the shaft 68 which must obviously accompany the dropping action of the drill units. The drill units are prevented from dropping too rapidly by a spring-pressed brake shoe 83 which bears against a friction drum 84 on the shaft 68 and acts to moderate the reverse rotation of the same.

The positioning mechanism (see Figs. 1, 2, 3, 9 and 13)—which operates to hold the tie in a centered position above the boring mechanism during the boring operation—includes two spaced cruciform spiders 85 which are secured to a horizontal transverse shaft 86 positioned directly above the boring mechanism. The ends of the shaft 86 extend through vertical slots 87 in two standards 88 at the sides of the frame 10, and are journaled in vertically slidable bearing brackets 89 on the standards adjacent the slots. The spiders 85 are characterized by legs 90 which are disposed substantially at right angles to each other. Two of the legs 90 of each of the spiders straddle the tie evenly when it is being bored, and, when the feeding device 19 of the conveying mechanism commences to move a new tie onto the rollers 45 at the ends of the rails 44 into approximate position to be bored, the new tie pushes against the nearest legs 90 of the spiders and causes the spiders to rotate a quarter of a turn, whereupon the tie already bored is kicked off from the ends of the rails 44 by the legs of the spiders, and the new tie is straddled evenly by two of the legs of each of the spiders in position to be bored. The spiders 85 are pressed downwardly upon the tie which they straddle by means of two downwardly spring-pressed rollers 91 (see Fig. 3) which bear in centering notches 92 in the peripheries of two otherwise circular disks 93 secured to the shaft 86 adjacent the standards 88. The notches 92 are arranged in the disks 93 directly opposite the tie-receiving crotches of the spiders 85, and serve to bring the spiders to rest upon the new tie to be bored with the legs 90 equally inclined to the vertical, thereby causing the tie, which is easily shifted by the spiders because of the character of the support given the tie by the rollers 45, to assume an accurately centered position with respect to the boring mechanism. Whenever the spiders are caused to rotate a quarter of a turn to position a new tie, the sides of the notches 92 engaged by the rollers 91 cam the rollers 91 upwardly onto the circular peripheries of the disks 93, and the rollers 91 are caused to remain in such inoperative positions until the spiders have almost completed their rotation. The operation of the positioning mechanism in kicking off the tie already bored and in centering a new tie, is facilitated by two vertically movable rollers 94 which move upwardly at the completion of each boring operation and engage with the disks 93 to elevate the same slightly, whereupon the spiders 85 are correspondingly raised, and the legs 90 of the spiders permitted to operate to better advantage. The rollers 94 move downwardly again out of engagement with the disks 93 when the new tie is in a position to be centered by the downwardly wedging action of the spiders. The vertical movement of the rollers 94 is obtained from a cam shaft 95 across the end of the frame 10 near the bottom of the same, the rollers 94 being journaled on pivoted levers 96, and the free ends of the levers 96 being connected by adjustable links 97 with vertically movable cam rollers 98 which coact with cams 99 on the shaft 95. The cam shaft 95 of course makes one revolution to each operation of the boring mechanism, and is driven from the shaft 35 by means of a chain 100 which is trained over a small sprocket 101 on the shaft 35 and a large sprocket 102 on the shaft 95. The pressure which the spiders 85 exert downwardly upon the tie being bored, may be adjusted by turning hand wheels 103 which serve to vary the compression of springs 104 which act upon the rollers 91 in engagement with the disks 93.

The marking mechanism (see Figs. 13, 14 and 15)—which operates to mark the ends of the tie with any desired data while it is being held by the positioning mechanism during the boring operation—consists of two oppositely disposed but otherwise similar units. Each of the two units includes a supporting bracket 105 which is secured to one of the standards 88 of the positioning mechanism. An elongated cylindrical die 106 is mounted for horizontal reciprocable movement in a cylindrical sleeve 107, which extends from the bracket 105 through an aperture in the standard 88. The inner end of the die holder 106 is provided with an interchangeable die plate 108 on which the marking data is embossed, and the outer end is provided with an axially extending rod 109 on which a cylindrical weight 110 is slidably mounted. A helical spring 111 encompasses the rod 109 between the weight 110 and an abutment 112 on the free end of the rod, and yieldingly tends to force the inner end of the weight 110 against the outer end of the die holder 106 whenever the die holder 106 is advanced while the weight 110 is held stationary. Every time that the conveying mechanism pushes a tie below the positioning mechanism, the die holder 106 is caused to advance toward the end of the tie by means of a lever 113 which engages in a notch in the die holder and is oscillated by a cam edge 114 on the face of a drum 115 secured to the cam shaft 95, while the weight 110 is held stationary by means of a latch 116 which engages in an annular groove in the weight and is movable vertically by a bell crank lever 117. As soon, however, as the die holder 106 is fully advanced with the die plate 108 approximately in abutment with the end of the tie, the latch 116 is disengaged from the weight by means of a stud 118 on the die holder which trips a hook 119 connected to the bell crank lever 117, whereupon the weight strikes the die holder a sharp blow under the impetus of the compressed spring 111 and the data on the die plate is imprinted in the relatively soft material of the tie. When the lever 113 is subsequently oscillated in the reverse direction by a cam edge 120 on the face of the drum 115, the die holder and the weight are retracted as a unit, and the latch 116, which rides on the surface of the weight while the weight is advanced, drops back into the groove in the weight. The retracted position of the die holder and the weight, prior to the delivery of the marking blow, is illustrated in Fig. 14.

In order to prevent the weight 110 from striking against the advanced die holder 106 in the absence of a tie in the positioning mechanism to receive the blow, a control lever 121 is arranged in a position where it will be depressed by a tie only when the tie is in position to receive the blow. The lever 121 is upwardly spring pressed by a suitably arranged spring, and is secured to a short rock shaft 122 which carries an arm 123. A link 124 connects the arm 123 with one arm of a bell crank lever 125, and another link 126 connects the other arm of the bell crank lever 125 with one arm of another bell crank lever 127. The other arm of the bell crank lever 127 supports the hook 119, either in the path of the stud 118 when the lever 121 is depressed, or out of the path of the stud when the lever is not depressed. It will be evident that, when the lever is not depressed and the hook 119 is as a consequence held out of the path of the stud 118, the latch 116 will continue to hold the weight 110 stationary when the die holder is fully advanced, and the die holder will be retracted in regular course without any blow being delivered into space by the marking mechanism.

The machine includes a safety device for stopping the feed of the ties by the conveying mechanism in the event that the drills of the boring mechanism fail to disengage from the tie after boring or else are delayed in dropping. The device (see Figs. 16 and 17) includes a pin 128 which projects from one face of a disk 129 secured to one end of the shaft 68 of the boring mechanism. The pin 128 supports the free end of a lever 130 which is loosely pivoted on a horizontal transverse shaft 131 journaled in the frame 10. When the drills 57 of the boring mechanism are elevated and contained within a tie during the boring operation, the lever 130 is at the upper limit of its oscillation, as shown in full lines in Fig. 16, and when the drills are lowered and out of engagement with the tie, the lever is at the lower limit of its travel, as shown in dotted lines in Fig. 16. A lever 132 is pivoted to the lever 130 at 133, and extends upwardly between the chains 31 and 39 into the path of movement of the ties on the conveying mechanism. The lower end of the lever 132 has a pivotal connection with one end of a short link 134, and the other end of the link 134 has a pin-and-slot connection with the free end of an arm 135 which is secured to the shaft 131. The shaft 131 also has secured thereto a weighted control handle 136 located at the side of the frame and a belt tightening arm 137 located in operative relation to the belt 54 which drives the conveying mechanism.

As long as the boring mechanism continues to operate in proper synchronism with the feeding of the ties, the vertically reciprocating lever 132 on the lever 130 will be at the lower limit of its travel with its upper end below the level of the rails 44 while a tie is being moved thereabove, but, if for any reason the descent of the drills 57 from the bored ties is delayed, the lever 132 will be correspondingly delayed in its upper position, as shown in full lines in Fig. 16, and will be pushed into an inclined position, as shown in dotted lines in Fig. 16; whereupon the shaft 131 will be rocked because of its connection with the lever 132, and the belt tightening arm 137 will be released from the belt 54. The consequent loosening of the belt of course immediately renders the same inoperative and stops the conveying mechanism. The lever 132 may then resume its vertical position under the influence of a spring 138, irrespective of the position of the control handle 136 and the belt tightening arm 137.

The machine also includes a safety device for preventing the drills from boring the same tie twice in the event that the bored tie is not kicked off from the supporting rollers 45 at the ends of the rails 44 owing to the absence of a following tie on the conveying mechanism. The device (see Figs. 18 and 19) includes a depressable shoe 139 which is disposed in the path of travel of the ties on the conveying mechanism, and is carried by an intermediate portion of a lever 140. The lever 140 is pivoted at one end to the frame 10, and is provided at its free end with a depending link 141 which is connected at its lower end to an intermediate portion of a lever 142. The lever 142 is pivoted at one end to the frame 10, and is provided at its free end with a shoulder 143 which is adapted to move, upon upward oscillation of the lever 142, into the path of oscillation of the lever 77 which was heretofore described in connection with the boring mechanism as the support for the clutch disengaging cam roller 76. It will be recalled that the clutch elements 69 and 72 will be separated axially of the shaft 68 by the cam roller 76 upon the completion of the boring operation, but will be free to re-engage for the next boring operation as soon as the cam roller 76 is released by the deflector plate 75 and the interfitting lugs and sockets 74 again arrive in opposition to each other.

If the conveying mechanism carries a tie which will be positioned above the boring mechanism in readiness for the next boring operation, the shoe 139 will be held in a depressed position by such tie at the time when the clutch elements are about to reengage, and the shoulder 143 on the lever 142 will as a consequence remain in its lowered position out of the path of oscillation of the lever 77 which moves with the clutch element 72. If, however, the conveying mechanism does not carry a tie in readiness for the next boring operation, due either to an oversight by the feeding operators or to an intentional discontinuance of the feeding, the shoe 139 will remain elevated when the clutch elements are about to re-engage, and the shoulder 143 will likewise remain elevated and prevent the lever 77 from moving any closer to the clutch element 69, thereby holding the clutch element 72 carried by the lever 77 out of engagement with the clutch element 69.

The operation of the machine may be summarized as follows:

The operators place a tie crosswise upon the ends of the rails 14 before each advance movement of the pair of hooks 20, of the conveying mechanism, and the pair of hooks 20 engage with the tie and move the same rapidly along the rails 14 into position for subsequent engagement by a pair of the dogs 30 of the conveying mechanism. The pair of dogs 30 continue to move the tie along the rails 14 into operative relation to the adzing and sawing mechanisms, where the seats are cut in the under side of the tie and the ends of the tie are cut off at points equidistant from the seats. When the tie reaches the ends of the rails 14 the seats in the tie ride onto the supporting rails 44, and the pair of lugs 38 of the conveying mechanism engage with the tie and move the same rapidly along the rails 44. During such movement the tie engages with a pair of the arms 90 of the spiders 85 of the positioning mechanism and rotates the spiders a quarter of a turn, whereby the preceding tie already positioned, bored and marked, is kicked from the ends of the rails 44 by the spiders, and the tie advanced is straddled by the spiders and accurately positioned. The rapidly rotating drills 57 of the boring mechanism then move upwardly into the tie and bore the holes in the seats, and the die plates 108 of the marking mechanism approach the ends of the tie and are impressed thereagainst under the impetus of the weights 110. The finished tie is then kicked from the ends of the rails 44 by the spiders 85 in rotating a quarter of a turn under the action of the following tie.

In Figs. 22 and 23 is shown a modified arrangement of the adzing and boring mechanisms. It will be observed that the single directly driven operating shaft 12 for the cutter heads 11 and the saws 16 is dispensed with, the cutter heads and saws being driven independently and from separate power sources. The position of the cutter heads 11 in the machine is unchanged, but the cutter heads are mounted on the ends of a relatively short shaft 144 journaled in the frame 10. The shaft 144 is rotated at the desired speed from an axially offset motor 145 which connects with the shaft 144 through suitable driving connections 146. The position of the saws 16 in the machine also remains unchanged, but each of the saws is secured to the end of an armature shaft 147 of a motor 148 carried on a base plate 149. The base plate 149 is slidably mounted in guides 150 provided by lateral extensions of the frame 10, and this arrangement permits each of the saws 16 to be adjusted toward or from the cutter heads 11. Such adjustment to the saws may be effected simultaneously and to an equal extent by means of an adjusting shaft 151 which is journaled, but held against axial movement, in the frame 10. The ends of the shaft 151 are oppositely screw-threaded, and engage in similarly threaded apertures 152 formed in arms 153 which extend rigidly from the movable base plates 149 of the saws. The shaft 151 may be rotated in either direction by means of a crank handle 154, whereby to cause the saws 16 to move axially toward or from the cutter heads 11.

In Figs. 24 and 25 is shown a modified form of the mechanism which serves to position each tie in proper relation to the boring mechanism. In this form the spiders 85 and their relating indexing and lifting devices are eliminated, and two transversely spaced pairs of tie-holding clamps 155 are instead used. Each pair of clamps 155 periodically raises up above the level of the rails 44 when a tie is pushed along such rails by the pair of lugs 38 into a position approximately above the drills 57, and clamps against the sides of the tie, whereby first to position the tie properly in centered relation to the boring mechanism and then to hold the tie in that position during the boring operation. After the tie thus held has been bored, each pair of clamps open and move downwardly again to a position below the level of the rails. The clamps 155 in each coacting pair are disposed in substantially vertical positions and are pivoted intermediate their ends at 156 to spaced portions of the free end of a long lever 157 which is pivoted at a remote point 158 to the frame 10. The free end of the lever 157 carrying the members 155 is periodically raised and lowered by means of a cam roller 159 on the lever which rides upon a substantially semicircular cam 160 secured to the previously described cam shaft 95. The clamps 155 are spread apart by interposed springs, as shown in Fig. 25, when approaching or leaving their elevated positions, and are caused to press against the opposite sides of the tie when they have assumed their elevated positions by means of a heavy roller 161 which is lowered into a crotch formed by the lower converging end portions 162 of the clamps 155. The weight of the roller tends to cam the ends 162 away from each other and results in a clamping of the upper spurred ends 163 against the tie. The roller 161 is mounted adjacent the free end of a long lever 164 which is pivoted at a remote point 165 to the frame 10, and the free end of the lever 164 carrying the roller 161 is periodically raised and lowered by means of a cam roller 166 on the lever which rides upon an irregularly shaped cam 167 secured to the shaft 95 alongside the cam 160. When the clamps 155 are lowered, the end clamp is prevented from swinging beyond the plane of the inclined end faces 168 of the rails 44 by means of a deflector plate 169 on the machine frame which engages with the lower end 162 of the clamp.

The modified positioning mechanism just described operates as follows: Let it be assumed that the parts of the positioning mechanism are in the locations shown in Fig. 24, wherein a tie has just been bored but the clamps 155 have not as yet retracted from the same. The cam roller 159 is about to be lowered by the cam 160, whereby to lower the clamps 155, and the cam roller 166 is about to be raised by the cam 167 whereby to raise the roller 161 out of engagement with the lower ends 162 of the clamps. When the cam shaft 95, which makes one revolution to each cycle of operation of the positioning mechanism, rotates into the position where the cam roller 159 is lowered and the cam roller 166 is raised, the upper ends 163 of the clamps 155 are spread apart by the raising of the roller 161, and are lowered by the lowering of the lever 157, thus releasing the bored tie. Just after the clamps 155 have released the bored tie and been lowered below the level of the rails 44, the pair of lugs 38 advance the next succeeding tie into the position previously occupied by the bored tie, and the bored tie is as a consequence pushed from the ends of the rails 44. This stage of the operation is illustrated in Fig. 25. The cam roller 166, which is then riding upon the arcuate face 170 of the cam 167, is elevated abruptly by a projection 171 on the cam 167, causing the roller 161 to be elevated well above the position of the lower ends 162 of the clamps even when in the raised positions they are about ready to assume, and the cam roller 159, which is then riding upon the low flat face 172 of the cam 160, is elevated to the high arcuate face 173 of the cam, causing the upper ends 163 of the clamps to raise to positions on opposite sides of the tie to be bored. The cam roller 166 then abruptly rides down the radial face 174 of the cam 167, causing the roller 161 to tilt the clamps into engagement with the tie to be bored. The action of the clamps 155 serves to position the tie directly over the center of the boring mechanism by reason of the fact that the pivots 156 of the clamps are equally spaced from the center line of the boring mechanism and the roller 161 which tilts the clamps bears downward against the clamps along such center line.

In Figs. 26 and 27 is shown a modified form of the mechanism for marking the ends of the ties. This form of the marking mechanism may be mounted upon a floor bracket 175 separate from and spaced to one side of the machine frame, and includes a marking die 176, a cylindrical die holder 177 which is axially adjustable in a clamping bracket 178, and a heavy leaf spring 179 to the upper end of which the bracket 178 is fixedly secured. The lower end of the spring 179 is fixedly secured to a bracket 180 which encompasses a pivot pin 181 journaled in the floor bracket 175, and extends into a longitudinal slot 182 in the pin whereby to lock the spring 179 and bracket 180 fixedly to the pin. A short rod 183 is pivoted to the bracket 180 at 184 and extends horizontally through a guiding aperture 185 in a portion of the floor bracket. A relatively long and heavy spring 186 for advancing the die encompasses all but a small portion of the rod 183 between the guiding portion of the floor bracket and an end abutment 187 on the rod, and a relatively short and light spring 188 for returning the die encompasses the rod between the guiding portion of the floor bracket and the pivoting point 184 of the rod. When the leaf spring 179 with its associated die 176 is oscillated to the left as viewed in Fig. 26, the spring 186 on the rod 183 will be compressed, and, when the spring 179 is released in that position, the spring 186 will tend to oscillate the spring 179 back again beyond its normal upright position with a rapid movement, causing the die 176 to strike into the end of the tie. The resiliency of the spring 179 gives an advantageous whip to the die 176 as it strikes the tie against the yielding resistance of the spring 188, and tends with the action of the spring 188, to withdraw the die quickly from the marked tie. The shaft 95, which has been previously mentioned in connection with the first described forms of the positioning and marking mechanisms, may be used to operate this form of the marking mechanism. The shaft 95 has secured thereto a disk 189, and the disk 189 is provided adjacent its periphery with a laterally extending lug 190. A lever 191 is pivoted at one end to a floor bracket 192, and rides at its free end upon the pin 190 on the disk 189. The lever 191 is of such length that, when the pin 190 reaches the uppermost point in its revolution, the free end of the lever will drop from the pin 190. It will, of course, be understood that, when the pin 190 reaches the lowermost point in its revolution, it will move under the free end of the lever 190 and will slowly elevate the same again. The lever 191 is connected intermediate its ends to the upper end of a downwardly extending link 193, and the lower end of the link 193 is in turn connected to the free end of an arm 194 which is fixedly associated with the bracket 180 which carries the leaf spring 179. Consequently, when the lever 191 is oscillated upwardly, the die 176 of the marking mechanism is caused to oscillate away from the end of the tie to be marked, and, when the lever 191 is released abruptly at the upper limit of its oscillation, the die 176 will be oscillated rapidly in a reverse direction under the action of the spring 186 and will properly mark the tie. The shaft 95 is so synchronized with the other mechanisms of the machine through the driving chain 100 as to make only one revolution for each cycle of operation of the machine, and the marking mechanism accordingly delivers one marking blow during the period while the tie is being held in position above the boring mechanism. It will be understood of course that the marking mechanism illustrated in Figs. 26 and 27 is duplicated at the other side of the machine.

In Fig. 28 is shown a modified arrangement and mounting of the two sets of rails 14 and 44 which support the tie during its passage through the machine. The rails 14, instead of being positioned at the sides of the cutter heads 11 as in the previous described forms of the machine, are arranged in longitudinal alignment with the cutter heads and terminate just in front of the same at 195, and the rails 44 which are also in longitudinal alignment with the cutter heads commence just rearwardly of the same at 196. The top level of the rails 14 is sufficiently below the top of the cutter heads to effect the desired depth of cut for the seats, and the top level of the rails 44 is approximately even with the top of the cutter heads in order that the seats in the tie will be fed progressively onto the rails 44 as cut and will be thereby stably supported against any tendency to rock forward. The rails 14 may be raised or lowered to vary the depth to which the seats are cut in the tie. With this object in view, the rails may be mounted on the upper ends of short supporting levers 197 which are pivoted at their lower ends to the frame 10, and any suitable means, such as a rod 198 which has a pivoted connection with the frame 10 and a screw-threaded connection with one of the levers 197, may be used to vary the inclination of the lever 197 to the vertical, whereby to vary the height of the rails 14. The rails 44 may also be raised or lowered to better conform to the height of the cutter heads 11, and, inasmuch as only minute variations would obviously be desirable, the rails may be supported on cylindrical bosses 199 which are eccentrically journaled in the frame 10 and are angularly adjustable therein by a lever arm 200.

To further stabilize the tie while it is passing through the zone of operation of the adzing and boring mechanisms, the machine may be equipped with a pair of weighted and inclined arms 201 which are pivotally supported at their upper ends from a bracket 202 secured to the ceiling or to a suitable superstructure of the frame 10. One arm holds the tie down against the rails 14 at a point above the yet uncut portion of the seat, and the other arm holds the tie down against the rails 44 at an opposite point on the tie above the already cut portion of the seat. The arms 202 may be limited in their downward movement when no tie is below the same by means of two rods 203 carried by the bracket 202. The dogs 30 move the tie along the rails 14 under the arms 201, and the arms bear upon the tie at such an inclination as to prevent the tie from rocking backward, after the fashion of ratchets, when the adzing and sawing mechanisms come into operation. It will be obvious that the hold-down device above described may be used to equal advantage in connection with the other forms of the machine.

I claim:

1. In a woodworking machine, means for feeding railway ties sidewise through the machine, including a support for the tie, two feeding devices arranged in tandem for moving the tie along corresponding portions of the support, and means for operating the two devices in synchronism at relatively different linear speeds along the support, the slower device serving to move the ties continuously along one portion of the support, and the faster device serving to move the ties intermittently along another portion of the support.

2. In a woodworking machine, means for feeding railway ties sidewise through the machine, including a support for the tie, three feeding devices arranged in tandem for moving the tie along corresponding portions of the support, and means for operating the three devices in syncronism with the third device at greater linear speed along the support than the second device, the first device serving to feed the ties to the second device, the second device serving to move the ties continuously along one portion of the support, and the third serving to move the ties intermittently along another portion of the support.

3. In a woodworking machine, means for feeding railway ties sidewise through the machine, including a support for the tie, an intermittently operating device adjacent the in-feeding end of the support for moving the tie placed thereon rapidly along the support away from such in-feeding end, a continuously operating device in tandem with the first device for receiving the tie from the first device and moving the same slowly farther along the support, another intermittently operating device in tandem with the second device for receiving the tie from the second device and moving the same rapidly farther along the support, and means for operating the devices in synchronism.

4. In a woodworking machine, means for feeding railway ties sidewise through the machine, including a substantially horizontal support for the tie extending through the machine, a pair of hooks adjacent the in-feeding end of the support for drawing the tie rapidly along the support and away from the in-feeding end, a pair of dogs for receiving the tie from the hooks and moving the tie slowly farther along the support, a pair of lugs for receiving the tie from the dogs and moving the tie rapidly to a position adjacent the out-feeding end of the support, and means for operating the hooks, dogs and lugs in synchronism.

5. In a woodworking machine, a substantially horizontal support for a railway tie, a pair of spaced frames below the support, an electric motor carried by each frame, a plurality of vertically disposed drills operatively connected with each motor for boring holes in the tie, and means for automatically moving the frames, motors and drills vertically as a unit upon each boring operation to bring the drills into engagement with the tie.

6. In a woodworking machine, a substantially horizontal support for a railway tie, a pair of spaced frames below the support provided with vertically disposed racks, means for guiding the frames vertically, an electric motor carried by each frame, a plurality of vertically disposed drills operatively connected with each motor for boring holes in the tie, a shaft provided with pinions in mesh with the racks on the frames for reciprocating the frames in the guiding means to move the drills vertically as a unit into engagement with the tie, and means for rotating the shaft.

7. In a woodworking machine, a substantially horizontal support for a railway tie, a pair of spaced frames below the support provided with vertically disposed racks, an electric motor carried by each frame, a plurality of vertically disposed drills operatively connected with each motor for boring holes in the tie, a shaft provided with pinions in mesh with the racks on the frames for reciprocating the frames to move the drills vertically as a unit into engagement with the tie, means for rotating the shaft, and a clutch between the rotating means and the shaft acting automatically to release the shaft from the driving means when the drills reach their uppermost position, whereby to permit the drills to descend under gravity.

8. In a woodworking machine, a substantially horizontal support for a railway tie, a pair of spaced frames below the support, an electric motor carried by each frame, a plurality of vertically disposed drills operatively connected with each motor for boring holes in the tie, means for moving the frames, motors and drills vertically as a unit to bring the drills into engagement with the tie, and adjusting means for shifting the frames with their associated boring devices laterally toward or away from each other simultaneously and to an equal extent relative to the center line of the support.

9. In a woodworking machine, a support for a railway tie, means for boring holes in a tie, and means for marking one end of the tie, comprising a die mounted for movement toward and away from the end of the tie, and a spring actuated weight for driving the die against the end of the tie, said weight being so synchronized in its operation with the operation of the boring means as to effect the marking operation only when the boring means is out of engagement with the tie.

10. In a woodworking machine, a support for a railway tie, means for boring holes in the tie, and means for marking one end of the tie, comprising a reciprocably mounted die, a device for driving the die against the end of the tie, a latch releasable to permit the device to operate and means to prevent the latch from being released when no tie is in position on the support to receive the impression.

11. In a woodworking machine, a support for a railway tie, means adjacent the support for boring holes in the tie, a pair of pivotally mounted arms for positioning the tie on the support in a predetermined relation to the boring means, and means for shifting the pivotal mounting of the arms toward the tie when the arms act to position the same.

12. In a woodworking machine, a support for a railway tie, means adjacent the support for boring holes in the tie, and means for positioning the tie on the support in centered relation to the boring means, comprising rollers interposed between the support and the tie for engagement with the under surface of the tie, and a pair of arms adjacent each side of the support which act to bear upon opposed surfaces of the tie with equal pressure only when the tie is in such centered relation.

13. In a woodworking machine, a substantially horizontal support for a railway tie, means below the support for boring holes in the tie, means at one side of the support for marking one end of the tie, means for moving the tie sidewise along the support into a position over the boring and opposite the marking means, and separate means for then positioning the tie automatically in centered relation to the boring and marking means.

14. In a woodworking machine, a substantially horizontal support for the work, means below the support for cutting a seat in the under face of the work, means for feeding the work along the support above the cutting means during the cutting operation, means below the support for boring holes in the under face of the work adjacent the seat, and means for receiving the work from the feeding means and positioning the work above the boring means, said support being so arranged beyond the cutting means as to bear against the seat in the tie during the boring operation.

15. In a woodworking machine, a substantially horizontal support for a railway tie, means for moving the tie sidewise along the support, a pair of spaced cutter heads projecting above the level of the support for cutting spaced seats in the under face of the tie during the movement of the same along the support, and means for rotating the cutter heads; said support consisting of two vertically adjustable feeding rails positioned in advance of the cutter heads at a lower level than the same, and two vertically adjustable receiving rails positioned rearwardly of the cutter heads in alignment with and at about the same level as the cutter heads.

16. In a woodworking machine, a substantially horizontal support for a railway tie, means for moving the tie sidewise along the support, mechanism below the support for performing a cutting operation on the tie when the tie is above the same, and downwardly pressing members inclined toward the support in the direction of feed for holding the tie down upon the support during the cutting operation, said members having weights adjustably mounted thereon.

17. In a woodworking machine, a support for a railway tie, means for feeding a tie along the support to a predetermined position thereon, means for boring holes in the tie while in that position, means for removing the bored tie from that position, and means operating in the interim when the tie is at rest for marking one end of the tie.

18. In a woodworking machine, a substantially horizontal support for a railway tie, means for moving the tie sidewise along the support, a pair of spaced cutter heads projecting above the level of the support for cutting spaced seats in the under face of the tie during the movement of the same along the support, and means for rotating the cutter heads; said support consisting of two feeding rails positioned in advance of the cutter heads at a lower level than the same, and two receiving rails positioned rearwardly of the cutter heads in alignment with and at about the same level as the cutter heads whereby to engage with the rails in the seats thereof.

19. In a woodworking machine, a support for a railway tie, means for boring holes in the tie, means for marking the ends of the tie, and means synchronized with the boring and marking means for automatically moving the ties into operative association with said means and discontinuing movement of the ties during operation of the same thereon.

20. In a woodworking machine, a support for a railway tie, means for boring holes in the tie, and means for marking one end of the tie, said marking means comprising a die mounted for movement toward and away from the end of the tie, a spring-actuated weight for driving the die against the end of the tie, a latch for holding the weight retracted, means operating in a definite relation to the operation of the boring means for releasing the latch and allowing the weight to be driven against the die, and means for rendering the latch-releasing means inoperative except when a tie is in operative relation to the die.

21. In a woodworking machine, a support for a railway tie, means for boring holes in a tie, and means for marking both ends of the tie, said means comprising two dies mounted for movement toward and away from the ends of the tie, two spring-actuated weights for driving the dies against the ends of the tie, two latches for holding the weights retracted and means for releasing the latches simultaneously, whereby the dies will act upon both ends of the tie in opposition to each other at the same time.

22. In a woodworking machine, a substantially horizontal support for a railway tie, means for moving the tie sidewise along the support, a pair of spaced cutter heads for cutting spaced seats in the under face of the tie during the movement of the same along the support, and means for rotating the cutter heads, said support consisting of two feeding rails positioned in advance of the cutter heads in alignment with but at a lower level than the top of the same, and two receiving rails positioned rearwardly of the cutter heads in alignment with and at about the same level as the top of the same, whereby before the seats are cut the tie will be supported at the location of the seats and after the seats are cut the tie will be supported in the seats, insuring a substantially uniform depth of cut irrespective of the shape of the tie.

23. In a woodworking machine, a pair of cutter heads for cutting spaced seats in a railway tie, two supporting rails for the tie positioned in advance of and in alignment with the cutterheads and terminating short of the same, two other supporting rails for the tie positioned rearwardly of and in alignment with the cutterheads and terminating short of the same, means positioned near the cutter heads and above the ends of the rails which are in advance of the cutter heads for holding the tie firmly down against the ends of those rails, and other means positioned near the cutter heads above the ends of the rails which are rearwardly of the cutter heads for holding the tie firmly down against the ends of those rails after the cutting operation.

In testimony whereof I have hereunto subscribed my name.

FRANKLIN L. LANE.